United States Patent
Fujishiro et al.

(10) Patent No.: US 8,974,610 B2
(45) Date of Patent: Mar. 10, 2015

(54) HIGH-STRENGTH WELDED STEEL PIPE AND METHOD FOR PRODUCING THE SAME

(75) Inventors: Taishi Fujishiro, Tokyo (JP); Takuya Hara, Tokyo (JP); Yoshio Terada, Tokyo (JP); Shinya Sakamoto, Tokyo (JP); Hitoshi Asahi, Tokyo (JP)

(73) Assignee: Nippon Steel & Sumitomo Metal Corporation, Tokyo (JP)

( * ) Notice: Subject to any disclaimer, the term of this patent is extended or adjusted under 35 U.S.C. 154(b) by 135 days.

(21) Appl. No.: 13/575,051

(22) PCT Filed: Feb. 4, 2011

(86) PCT No.: PCT/JP2011/052348
§ 371 (c)(1),
(2), (4) Date: Jul. 25, 2012

(87) PCT Pub. No.: WO2011/096510
PCT Pub. Date: Aug. 11, 2011

(65) Prior Publication Data
US 2012/0291907 A1    Nov. 22, 2012

(30) Foreign Application Priority Data
Feb. 4, 2010  (JP) .................. 2010-022831

(51) Int. Cl.
*C21D 9/08* (2006.01)
*C21D 8/10* (2006.01)
(Continued)

(52) U.S. Cl.
CPC .......... *B23K 35/3053* (2013.01); *B23K 31/027* (2013.01); *C21D 8/105* (2013.01); *C21D 9/08* (2013.01); *C21D 9/50* (2013.01); *C22C 38/002* (2013.01); *C22C 38/02* (2013.01); *C22C 38/04* (2013.01); *C22C 38/12* (2013.01);
(Continued)

(58) Field of Classification Search
None
See application file for complete search history.

(56) References Cited

U.S. PATENT DOCUMENTS

2010/0330388 A1*  12/2010  Hara et al. .................... 428/586

FOREIGN PATENT DOCUMENTS

| CA | 2751705 | 8/2010 |
|---|---|---|
| CN | 1494599 | 5/2004 |

(Continued)

OTHER PUBLICATIONS

Machine-English translation of Japanese Patent No. 2009-068078, Apr. 2, 2009, Furukawa Naohiro et al.*

(Continued)

*Primary Examiner* — Deborah Yee
(74) *Attorney, Agent, or Firm* — Kenyon & Kenyon LLP (57) ABSTRACT

A high-strength welded steel pipe is obtained by welding a seam weld portion of a steel plate that are formed in a pipe shape. In the high-strength welded steel pipe, a base metal of the steel plate includes, by mass %, C: 0.010% to 0.080%, Si: 0.01% to 0.50%, Mn: 0.50% to 2.00%, S: 0.0001% to 0.0050%, Ti: 0.003% to 0.030%, Mo: 0.05% to 1.00%, B: 0.0003% to 0.0100%, O: 0.0001% to 0.0080%, N: 0.006% to 0.0118%, P: limited to 0.050% or less, Al: limited to 0.008% or less, and the balance of Fe and inevitable impurities, Ceq is 0.30 to 0.53, Pcm is 0.10 to 0.20, [N]−[Ti]/3.4 is less than 0.003, the average grain size of the prior γ grains in heat affected zones in the steel plate is 250 μm or less, and the prior γ grains include bainite and intragranular bainite.

9 Claims, 2 Drawing Sheets

(51) Int. Cl.

| | | |
|---|---|---|
| *C22C 38/12* | (2006.01) | |
| *C22C 38/02* | (2006.01) | |
| *C22C 38/04* | (2006.01) | |
| *F16L 31/02* | (2006.01) | |
| *B23K 35/30* | (2006.01) | |
| *B23K 31/02* | (2006.01) | |
| *C21D 9/50* | (2006.01) | |
| *C22C 38/00* | (2006.01) | |
| *C22C 38/14* | (2006.01) | |

(52) U.S. Cl.
CPC ............ *C22C 38/14* (2013.01); *B23K 2201/06* (2013.01); *B23K 2203/04* (2013.01); *C21D 2211/002* (2013.01); *Y10S 148/909* (2013.01)
USPC .......... 148/330; 148/332; 148/333; 148/334; 148/335; 148/336; 148/909; 148/519; 148/520; 148/521; 148/590; 148/593; 138/171

(56) References Cited

FOREIGN PATENT DOCUMENTS

| | | |
|---|---|---|
| CN | 101541994 | 9/2009 |
| EP | 1375681 | 1/2004 |
| EP | 1995339 | 11/2008 |
| JP | 07-097657 | 4/1995 |
| JP | 08-325635 | 12/1996 |
| JP | 11-172374 | 6/1999 |
| JP | 11-172375 | 6/1999 |
| JP | 2000-345239 | 12/2000 |
| JP | 2001-355039 | 12/2001 |
| JP | 2002-047532 | 2/2002 |
| JP | 2003-064449 | 3/2003 |
| JP | 2003-138340 | 5/2003 |
| JP | 3602471 | 12/2004 |
| JP | 2005-290526 | 10/2005 |
| JP | 2007-239049 | 9/2007 |
| JP | 2008-163455 | 7/2008 |
| JP | 2008-163456 | 7/2008 |
| JP | 2009-052106 | 3/2009 |
| RU | 2152450 | 7/2000 |
| RU | 2205246 | 5/2003 |
| RU | 2208747 | 7/2003 |

OTHER PUBLICATIONS

International Search Report dated Apr. 26, 2011, issued in corresponding PCT Application No. PCT/JP2011/052348.
Notice of Allowance dated Oct. 9, 2013 issued in corresponding Russian Application No. 2012132957 [With English Translation].
Chinese Office Action dated Aug. 13, 2013 issued in corresponding Chinese Application No. 201180008078.2 [With English Translation].
Office Action dated Feb. 3, 2014 issued in corresponding Canadian Application No. 2788713.
Office Action dated Feb. 27, 2014 issued in corresponding Korean Application No. 10-2012-7020273 [with English Translation].
Chinese Office Action dated Dec. 18, 2014, issued in corresponding Chinese Application No. 201180008078.2 (with English Translation).

* cited by examiner

HIGH-STRENGTH WELDED STEEL PIPE AND METHOD FOR PRODUCING THE SAME

FIELD OF THE INVENTION

The present invention relates to a high-strength welded steel pipe that is preferably used for a line pipe for transporting crude oil or natural gas and excellent in terms of low-temperature toughness, and a method for manufacturing the same.

This application is a national stage application of International Application No. PCT/JP2011/052348, filed Feb. 4, 2011, which claims priority to Japanese Patent Application No. 2010-22831, filed Feb. 4, 2010, the content of which is incorporated herein by reference.

DESCRIPTION OF RELATED ART

Currently, steel pipes for a line pipe of American Petroleum Institute (API) X70 grade (tensile strength of 570 MPa or more) to X80 grade (tensile strength of 625 MPa or more) are in practical use as a material for trunk pipelines for long-distance transportation of crude oil or natural gas. Recently, an increase in the internal pressure of a pipe line has been being studied in order to further improve transportation efficiency, and there is a demand for an increase in the thickness of a high-strength steel pipe for a line pipe of X70 or more, and, furthermore, X80 or more so that a high internal pressure can be born. In addition, since drilling areas for crude oil or natural gas will extend to extremely cold districts, such as the Arctic Circle, in the future, there is an expected demand for high-strength thick steel pipes for a line pipe to have low-temperature toughness at −40° C. or lower, and, furthermore, −60° C. or lower. Particularly, when a steel pipe is manufactured, a steel plate is formed into a pipe shape through a UO process, and then seam portions are welded through arc welding with the edge portions facing each other. However, when the plate thickness (thickness) increases, high heat input is required, and the grain size in heat affected zones (hereinafter also referred to as HAZ) increases, and therefore degradation of low-temperature toughness becomes a critical problem.

For a measure to the above, as techniques for improving low-temperature toughness of a high-strength thick steel pipe for a line pipe in HAZ, there is a method in which the amount of C is extremely reduced so as to have bainite as a dominant microstructure (for example, Patent Citations 1 and 2). In addition, there is a method in which the microstructures in HAZ are refined using intragranular transformation (for example, Patent Citations 3 to 5). Furthermore, there is a method in which martensite-austenite constituents (hereinafter also referred to as MA), which are detrimental to toughness, are controlled by optimization of alloy elements using a microstructure mainly including bainite having a specified crystallographic orientation relationship (for example, Patent Citation 6). In addition, with regard to a thick steel pipe having enhanced hardenability, there is method in which HAZ are refined using intragranular bainite in a microstructure mainly including bainite (for example, Patent Citation 7). The above methods are extremely effective for improvement in low-temperature toughness in HAZ. Recently, an increase in the thickness and low-temperature toughness of a high-strength line pipe have been increasingly required, and therefore there are demands for a thickness of 20 mm or more and HAZ toughness at −60° C. or lower. However, through the existing methods, it has been difficult to achieve the above demands.

PATENT CITATION

[Patent Citation 1] Japanese Patent No. 3602471
[Patent Citation 2] Japanese Unexamined Patent Application, First Publication No. 2000-345239
[Patent Citation 3] Japanese Unexamined Patent Application, First Publication No. H08-325635
[Patent Citation 4] Japanese Unexamined Patent Application, First Publication No. 2001-355039
[Patent Citation 5] Japanese Unexamined Patent Application, First Publication No. 2003-138340
[Patent Citation 6] Japanese Unexamined Patent Application, First Publication No. 2007-239049
[Patent Citation 7] Japanese Unexamined Patent Application, First Publication No. 2008-163456

SUMMARY OF THE INVENTION

Problems to be Solved by the Invention

An increase in the strength and an increase in the thickness of a steel pipe are effective for improvement of transportation efficiency of a line pipe, but it becomes difficult to secure HAZ toughness at welds in the steel pipe at a low temperature. Particularly, for a material having a thickness of 20 mm or more, high heat input becomes required during seam welding, and the grain size in HAZ increases, and therefore it becomes extremely difficult to secure toughness at an extremely low temperature of −40° C., and, furthermore, −60° C.

The present invention has been made in consideration of the above circumstances, and an object of the present invention is to provide a high-strength welded steel pipe that can sufficiently secure low-temperature toughness in HAZ at an extremely low temperature of −40° C., and, furthermore, −60° C. even particularly when the thickness is 20 mm or more, and, furthermore, 30 mm or more, and a method of manufacturing the same.

In the present invention, a high-strength welded steel pipe that has a fine microstructure including bainite and intragranular bainite in microstructures in HAZ, and is excellent in terms of low-temperature toughness, and a method of manufacturing the same are provided.

Methods for Solving the Problem

In the high-strength welded steel pipe according to the present invention, a steel plate having a chemical composition that C and Al are reduced, appropriate amounts of Ti and N are added in order to suppress a coarsening in the sizes of the prior γ grains in HAZ, an appropriate amount of B is added in order to suppress coarse intergranular ferrite formed during high heat input seam welding, and the carbon equivalent Ceq, which is a parameter of hardenability, and the parameter crack measurement Pcm, which is the weld crack sensitivity composition, are controlled to optimal ranges, is seam-welded. Specifically, the purport of the present invention is as follows:

(1) A high-strength welded steel pipe obtained by welding the seam weld portion of a steel plate that are formed in a pipe shape, in which a base metal of the steel plate includes, by mass %, C: 0.010% to 0.080%, Si: 0.01% to 0.50%, Mn: 0.50% to 2.00%, S: 0.0001% to 0.0050%, Ti: 0.003% to 0.030%, Mo: 0.05% to 1.00%, B: 0.0003% to 0.0100%, O: 0.0001% to 0.0080%, N: 0.006% to 0.0118%, P: limited to 0.050% or less, Al: limited to 0.008% or less, and the balance of iron and inevitable impurities, in a case in which [C], [Si], [Mn], [Ni], [Cu], [Cr], [Mo], [V], [B], [N], and [Ti] are defined as the amounts of C, Si, Mn, Ni, Cu, Cr, Mo, V, B, N, and Ti by mass %, respectively, Ceq that is obtained from the following equation <1> is 0.30 to 0.53, Pcm that is obtained from the following equation <2> is 0.10 to 0.20, the [N] and the [Ti] satisfy the following equation <3>, the average grain size of prior γ grains in heat affected zones in the steel plate is 250 μm or less, and the prior γ grains include bainite and intragranular bainite.

$$Ceq=[C]+[Mn]/6+([Ni]+[Cu])/15+([Cr]+[Mo]+[V])/5 \quad <1>$$

$$Pcm=[C]+[Si]/30+([Mn]+[Cu]+[Cr])/20+[Ni]/60+ [Mo]/15+[V]/10+5[B] \quad <2>$$

$$[N]-[Ti]/3.4<0.003 \quad <3>$$

(2) In the high-strength welded steel pipe according to (1), the base metal may further include, by mass %, one or more selected from Cu: 0.05% to 1.5%, Ni: 0.05% to 5.00%, Cr: 0.02% to 1.50%, W: 0.01% to 0.50%, V: 0.010% to 0.100%, Nb: 0.001% to 0.200%, Zr: 0.0001% to 0.0500%, Ta: 0.0001% to 0.0500%, Mg: 0.0001% to 0.0100%, Ca: 0.0001% to 0.0050%, REM: 0.0001% to 0.0050%, Y: 0.0001% to 0.0050%, Hf: 0.0001% to 0.0050%, and Re: 0.0001% to 0.0050%.

(3) In the high-strength welded steel pipe according to (1) or (2), the plate thickness of the base metal may be 20 mm to 40 mm.

(4) In the high-strength welded steel pipe according to (1) or (2), in a case in which a circumferential direction is a tensile direction, the tensile strength of the base metal may be 500 MPa to 800 MPa.

(5) In a method of manufacturing a high-strength welded steel pipe according to an aspect of the present invention, the method includes: forming a steel plate having a chemical composition according to (1) or (2) into a pipe shape; and seam-welding a seam weld portion through arc welding so as to form a seam-welded portion.

(6) In the method of manufacturing the high-strength welded steel pipe according to (5), the arc welding may be submerged arc welding.

(7) In the method of manufacturing the high-strength welded steel pipe according to (6), the heat input of the submerged welding may be 3.5 kJ/mm to 10.0 kJ/mm.

(8) In the method of manufacturing the high-strength welded steel pipe according to (5), the method may further include performing a heat treatment of the seam-welded portion.

(9) In the method of manufacturing the high-strength welded steel pipe according to (8), the heating temperature may be 300° C. to 600° C. during the heat treatment.

Effects of the Invention

According to the present invention, since a high-strength welded steel pipe has a chemical composition that includes appropriate amounts of Ti, N, and B, and enhances hardenability, and has a HAZ after seam welding with prior γ grain size of 250 μm or less, and a fine microstructure including bainite and intragranular bainite in the prior γ grains, the strength and the HAZ toughness at an extremely low temperature are improved. Therefore, the present invention can provide a high-strength welded steel pipe that is excellent in terms of low-temperature toughness and a method of manufacturing the same, and significantly contributes to the industry.

DETAILED DESCRIPTION OF THE INVENTION

In order to improve HAZ toughness at a low temperature, particularly, securing of toughness at an extremely low temperature of −40° C., and, furthermore, −60° C., refining of crystal grains is required. However, for a material having a thickness of 20 mm or more, the heat input (the amount of the heat input) increases during seam welding, and the grain size in HAZ increases, and therefore it becomes extremely difficult to secure toughness at an extremely low temperature of −40° C., and, furthermore, −60° C. As a result, the inventors studied a method that suppresses a coarsening in the sizes of γ grains during welding, refines the microstructure using intragranular bainite without forming coarse intergranular ferrite, and thus improves low-temperature toughness.

The inventors firstly carried out studies regarding the influences of chemical component conditions on the prior γ grain size (the prior austenite grain size) in HAZ.

Firstly, the following steel was prepared as a molten steel and cast so as to manufacture a slab. The steel includes, by mass %, 0.010% to 0.080% of C, 0.01% to 0.50% of Si, 0.50% to 2.00% of Mn, 0.0001% to 0.0050% of S, 0.003% to 0.030% of Ti, 0.05% to 1.00% of Mo, 0.0003% to 0.050% of B, and 0.0001% to 0.0080% of O. In the steel, the amount of P is controlled to 0.050% or less, the amount of Al is controlled to 0.008% or less, the carbon equivalent Ceq, which is a parameter of hardenability, is adjusted to 0.30% to 0.53%, and the parameter crack measurement Pcm, which is a weld crack sensitivity composition, is adjusted to 0.10% to 0.20%. In addition, the steel further includes 28 ppm to 65 ppm of N.

Figure 1:
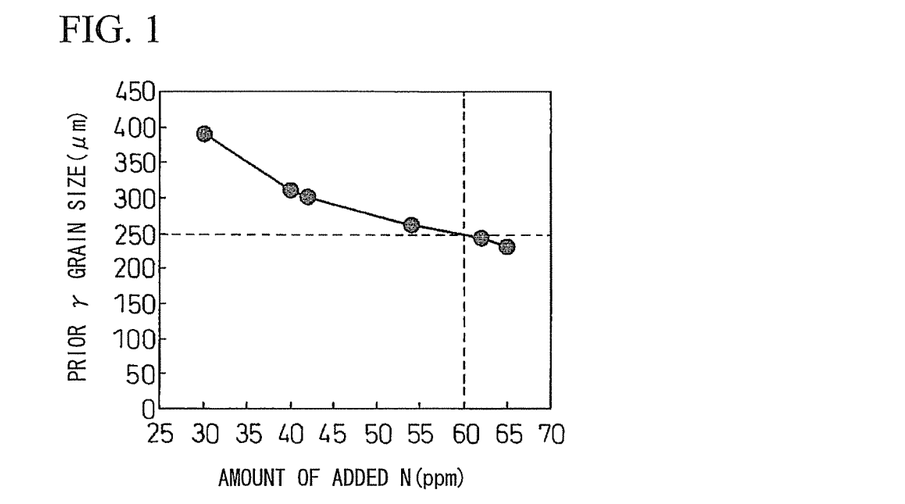
FIG. 1 is a view showing a relationship between the amount of N added and the prior γ grain size.

Next, 120 mm length×12 mm square test specimens were cut from the obtained rough-rolled slab, a heat treatment that simulated HAZ in a seam-welded portion was carried out on the test specimens, and then the prior γ grain size in the test specimens were measured. The results are shown in FIG. 1. FIG. 1 is a view showing the relationship between the amount of N added and the prior γ grain size. As shown in FIG. 1, it was found that, when Ti and N are added to steel so as to adjust the amount of N to 0.006% or more, the prior γ grain size becomes 250 μm or less.

Furthermore, after the heat treatment, Charpy impact test specimens were prepared, Charpy impact tests were carried out, and absorbed energies were measured at −60° C. The results are shown in FIG. 2.

Figure 2:
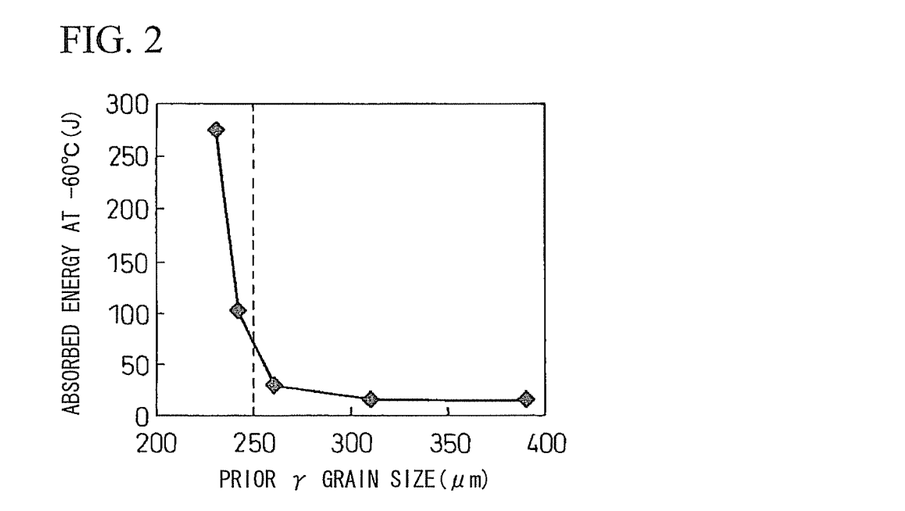
FIG. 2 is a view showing a relationship between the prior γ grain size and Charpy absorbed energy at −60° C.

FIG. 2 is a view showing the relationship between the prior γ grain size and Charpy absorbed energy at −60° C. in a case in which the microstructure does not include coarse intergranular ferrite. As shown in FIG. 2, when the prior γ grain size is 250 μm or less, the absorbed energy becomes 50 J or more at −60° C. Meanwhile, in FIGS. 1 and 2, the maximum value of the sizes of the prior γ grains was used as the prior γ grain size for convenient measurement.

Figure 3:
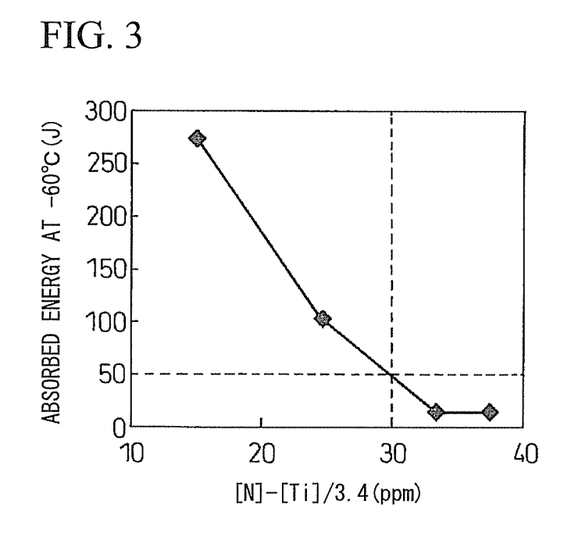
FIG. 3 is a view showing a relationship between [N]−[Ti]/3.4 and Charpy absorbed energy at −60° C.

FIG. 3 is a view showing the relationship between [N]−[Ti]/3.4 and Charpy absorbed energy at −60° C. As shown in FIG. 3, when [N]−[Ti]/3.4 is less than 0.003% (less than 30 ppm), the absorbed energy becomes 50 J or more at −60° C. [N]−[Ti]/3.4 is considered to have an influence on whether or not coarse intergranular ferrite is formed in the microstructure. When [N]−[Ti]/3.4 is 0.003% or more, BN is formed due to excessive addition of N, and an effect of B for improving hardenability is decreased. However, when [N]−[Ti]/3.4 is less than 0.003%, the effect of B for improving hardenability is secured, and formation of coarse intergranular ferrite is suppressed so that a fine microstructure mainly including bainite and intragranular bainite is obtained. As a result, it is considered that test specimens having [N]−[Ti]/3.4 of less than 0.003% show excellent toughness.

In the present invention, toughness is improved by decreasing the amount of C and controlling the microstructure to a low-temperature transformation structure mainly including bainite. Furthermore, a coarsening in the sizes of the prior γ grains in heat affected zones is suppressed during high heat input welding by adding appropriate amounts of Ti and N to steel. In addition, B is added to steel so as to enhance hardenability and suppress formation of coarse intergranular ferrite, and intragranular bainite is used. In the present invention, by the above method, the effective grain size in HAZ is refined, and a high-strength welded steel pipe having improved low-temperature toughness is provided. That is, in the present invention, the amount of Al is reduced, and an appropriate amount of Ti is added to steel while the amount of oxygen is controlled so as to disperse fine inclusions that extremely effectively act as nucleation sites of intragranular transformation. Furthermore, appropriate amounts of Ti, N, and B are added to steel so as to disperse fine inclusions that extremely effectively act as pinning particles that suppress a coarsening in the sizes of the prior γ grains and fine inclusions that extremely effectively act as nucleation sites of intragranular transformation, whereby formation of coarse ferrite from the prior γ grain boundaries is suppressed. As such, in the present invention, the effective grain size is refined by suppression of a coarsening in the sizes of the prior γ grains and acceleration of intragranular transformation.

The inventors carried out more detailed studies, obtained the following knowledge, and completed the present invention.

Hereinafter, the chemical composition of a steel plate (base metal) for manufacturing a steel pipe according to an embodiment of the present invention will be described in detail. Meanwhile, in the following, "%" that indicates the amount of the each element refers to mass %. In addition, the balance of the basic chemical components and the optional chemical elements as shown below is composed of iron (Fe) and inevitable impurities.

C is an element that improves the strength of steel. In order to secure strength and obtain a fine microstructure including hard bainite and intragranular bainite in the microstructure in HAZ, it is necessary to include 0.010% or more of C in steel. In addition, in order to satisfy both high strength and high toughness, the amount of C is 0.080% or less. In order to further improve the balance between strength and toughness, the amount of C is preferably 0.078% or less.

Si is a deoxidizing element. In order to sufficiently carry out deoxidization, it is necessary to include 0.01% or more of Si in steel. On the other hand, when steel contains more than 0.50% of Si, toughness in HAZ deteriorates, and therefore the upper limit of the amount of Si is 0.50%.

Mn is an element that enhances hardenability. In order to secure strength and toughness, it is necessary to include 0.50% or more of Mn in steel. On the other hand, when the amount of Mn exceeds 2.00%, toughness in HAZ is deteriorated. Therefore, the amount of Mn is 0.50% to 2.00%.

P is an impurity. When steel contains more than 0.050% of P, the toughness of the base metal (base metal portion) is significantly degraded. Therefore, the amount of P is limited to 0.050% or less. In order to improve toughness in HAZ, the amount of P is preferably limited to 0.020% or less. Meanwhile, the amount of P may exceed 0%.

S is an impurity. When steel contains more than 0.0050% of S, coarse sulfides are formed, and toughness is degraded. In contrast, when Ti oxides are finely dispersed in a steel plate, MnS is precipitated, intragranular transformation occurs, and the toughness of the steel plate (base metal) and in HAZ is improved. In order to obtain the above effects, it is necessary to include 0.0001% or more of S in steel. Therefore, the amount of S is 0.0001% to 0.0050%. In order to improve toughness in HAZ, the upper limit of the amount of S is preferably 0.0030%.

Al is a deoxidizing agent. However, when a large amount of Al is added to steel, formation of Ti oxides, which act as nucleation sites of intragranular transformation, is inhibited, and toughness in HAZ is degraded. Therefore, in order to form Ti oxides which contribute to intragranular transformation, the upper limit of Al needs to be 0.008%. In addition, in order to finely disperse Ti oxides, the upper limit of Al is preferably 0.005%, and, in order to more stably obtain Ti oxides, the upper limit of Al is more preferably 0.003%. Meanwhile, the amount of Al may exceed 0%.

Ti is an element that forms Ti nitrides which contribute to a refinement in the sizes of crystal grains in the steel plate (base metal) and HAZ. Therefore, it is necessary to include 0.003% or more of Ti in steel. In order to further refine the grain size in HAZ, the amount of Ti is preferably 0.005% or more. On the other hand, when steel contains excessive Ti, coarse inclusions are formed so as to deteriorate toughness, and therefore the upper limit of Ti is 0.030%. In addition, in order to more finely disperse Ti oxides, the amount of Ti is preferably 0.028% or less. When finely dispersed, Ti oxides effectively act as nucleation sites of intragranular transformation. When the amount of oxygen is large during addition of Ti, coarse Ti oxides are formed, and therefore it is preferable to carry out deoxidization using Si and Mn so as to decrease the amount of oxygen in steel during steelmaking In this case, since Al oxides are easily formed than Ti oxides, including an excessive amount of Al in steel for deoxidization is not preferred.

B is an important element that significantly enhances hardenability and suppresses formation of coarse intergranular ferrite in HAZ. In order to obtain the above effects, it is necessary to include 0.0003% or more of B in steel. In addition, in order to reliably enhance hardenability, the amount of B is preferably 0.0005% or more. On the other hand, when an excessive amount of B is added to steel, since coarse BN is formed, and, particularly, toughness in HAZ is degraded, the upper limit of the amount of B is 0.0100%.

N is an element that forms a Ti nitride that contributes to a refinement in the sizes of crystal grains in the steel plate (base metal) and HAZ. Therefore, in order to obtain a prior γ grain size in HAZ of 250 μm or less, an amount of N of 0.006% or more is required. On the other hand, when steel contains an excessive amount of N, BN is formed, and the effect of B for improving hardenability is decreased. As a result, coarse intergranular ferrite is formed, or coarse BN is formed so as to deteriorate toughness in HAZ. Therefore, the upper limit of the amount of N is 0.0118%.

Mo is an element that significantly enhances hardenability particularly when added together with B. In order to enhance hardenability so as to improve strength and toughness, 0.05% or more of Mo is included in steel. On the other hand, since Mo is an expensive element, the upper limit of the amount of Mo needs to be 1.00%.

O is an impurity. In order to avoid degradation of toughness due to formation of inclusions, it is necessary to control the upper limit of the amount of O to 0.0080%. In order to form Ti oxides that contribute to intragranular transformation, the amount of O that remains in steel during casting needs to be 0.0001% or more.

Furthermore, as chemical elements that improve strength and toughness, one or more selected from Cu, Ni, Cr, W, V, Nb, Zr, and Ta may be added to steel according to necessity. In addition, in a case in which the amounts of the elements are less than the preferable lower limits, since each of the elements does not have a particularly adverse influence, the elements (Cu, Ni, Cr, W, V, Nb, Zr, and Ta) can be considered as impurities.

Cu and Ni are effective elements for enhancing strength without deteriorating toughness. In order to obtain the above effect, the lower limits of the amount of Cu and the amount of Ni are preferably 0.05%. On the other hand, in order to suppress occurrence of cracks during heating of slabs and welding, the upper limit of the amount of Cu is preferably 1.50%. When steel contains excessive Ni, weldability is deteriorated, and therefore the upper limit of the amount of Ni is preferably 5.00%. Meanwhile, Cu and Ni are preferably included in combination in order to suppress occurrence of surface defects. In addition, from the viewpoint of costs, the upper limits of the amount of Cu and the amount of Ni are more preferably 1.00%.

Cr, W, V, Nb, Zr, and Ta are elements that form carbides and nitrides, and improve the strength of steel through precipitation strengthening, and one or more selected from Cr, W, V, Nb, Zr, and Ta may be included in steel according to necessity. In order to effectively enhance the strength, it is preferable that the lower limit of the amount of Cr be 0.02%, the lower limit of the amount of W be 0.01%, the lower limit of the amount of V be 0.010%, the lower limit of the amount of Nb be 0.001%, and the lower limits of the amount of Zr and the amount of Ta both be 0.0001%. On the other hand, when excessive amounts of Cr and W are added to steel, there are cases in which the strength is enhanced due to improvement of hardenability, and toughness is deteriorated. Therefore, it is preferable that the upper limit of the amount of Cr be 1.50%, and the upper limit of the amount of W be 0.50%. In addition, when excessive amounts of V, Nb, Zr, and Ta are added to steel, there are cases in which carbides and nitrides are coarsened, and toughness is deteriorated. Therefore, it is preferable that the upper limit of the amount of V be 0.100%, the upper limit of the amount of Nb be 0.200%, and the upper limits of the amount of Zr and the amount of Ta both be 0.0500%.

Furthermore, in order to control the morphology of inclusions so as to improve toughness, one or more selected from Mg, Ca, REM, Y, Hf, and Re may be added to steel according to necessity. In addition, in a case in which the amounts of the elements are less than the preferable lower limits, since each of the elements does not have a particularly adverse influence, the elements (Mg, Ca, REM, Y, Hf, and Re) can be considered as impurities.

Mg is an element having effects of refining oxides and controlling the morphology of sulfides. Particularly, fine Mg oxides act as nucleation sites of intragranular transformation, and suppress a coarsening in grain sizes as pinning particles. In order to obtain the effects, steel preferably includes 0.0001% or more of Mg through addition of Mg. On the other hand, when more than 0.0100% of Mg is included in steel, there are cases in which coarse oxides are formed such that toughness in HAZ is degraded. Therefore, the upper limit of the amount of Mg is preferably 0.0100%.

Ca and REM are useful for controlling the morphology of sulfides, and elements that form sulfides of Ca and REM so as to suppress formation of MnS that is elongated in a rolling direction and improve the characteristics of a steel in the through-thickness direction, particularly lamellar tear resistance. In order to obtain the above effects, the lower limits of the amount of Ca and the amount of REM are all preferably 0.0001%. On the other hand, when the amount of Ca and the amount of REM exceed 0.0050%, there are cases in which amounts of oxides of Ca and REM increase such that an amount of fine Ti-containing oxides decreases, and formation of intragranular transformation is inhibited. Therefore, the amount of Ca and the amount of REM are preferably 0.0050% or less.

Y, Hf, and Re are also elements having the same effects as Ca and REM. Therefore, when excessive amounts of Y, Hf, and Re are added to steel, there are cases in which formation of intragranular transformation is inhibited. Therefore, the amount of Y, the amount of Hf, and the amount of Re are preferably 0.0001% to 0.0050%.

Furthermore, in the embodiment, particularly, in order to secure hardenability in HAZ so as to enhance toughness, the carbon equivalent Ceq in the following equation <4>, which is computed from the amounts [mass %] of C, Mn, Ni, Cu, Cr, Mo, and V, is set to 0.30% to 0.53%. When the carbon equivalent Ceq in the equation <4> is less than 0.30%, strength is insufficient. On the other hand, when the carbon equivalent Ceq exceeds 0.53%, toughness is deteriorated. In addition, in a case in which it is necessary to further secure the balance between strength and toughness, the carbon equivalent Ceq in the equation <4> is preferably 0.33% to 0.48%.

$$Ceq=[C]+[Mn]/6+([Ni]+[Cu])/15+([Cr]+[Mo]+[V])/5 \qquad <4>$$

In addition, in order to secure low-temperature toughness in the steel plate (base metal) and HAZ, the parameter crack measurement Pcm in the following equation <5>, which is computed from the amounts [by mass %] of C, Si, Mn, Cu, Cr, Ni, Mo, V, and B, is set to 0.10% to 0.20%. When the parameter crack measurement Pcm in the equation <5> is less than 0.10%, strength is insufficient. On the other hand, when the parameter crack measurement Pcm exceeds 0.20%, toughness or weldability is deteriorated. In addition, in a case in which it is necessary to further secure the balance between strength and toughness, the parameter crack measurement Pcm in the equation <5> is preferably 0.13% to 0.19%.

$$Pcm=[C]+[Si]/30+([Mn]+[Cu]+[Cr])/20+[Ni]/60+ [Mo]/15+[V]/10+5[B] \qquad <5>$$

Herein, [C], [Si], [Mn], [Cu], [Cr], [Ni], [Mo], [V], and [B] refer to the amounts [by mass %] of C, Si, Mn, Cu, Cr, Ni, Mo, V, and B, respectively.

Meanwhile, since Ni, Cu, Cr, and V are elements that are optionally included in steel, in a case in which the amounts of the elements are less than the preferable lower limits, the elements are considered as impurities, and, in the equations <1> and <2>, [Ni], [Cu], [Cr], and [V] are 0% in computation.

Furthermore, in order to set the prior γ grain size to 250 μm or less, the amount of N needs to be 0.006% or more. In addition, in order to suppress formation of intergranular ferrite, the amounts of Ti and N need to satisfy the following equation <6>.

$$[N]-[Ti]/3.4<0.003 \qquad <6>$$

Herein, [N] and [Ti] refer to the amounts [by mass %] of N and Ti.

In addition, as described above, it is necessary to set the average grain size of the prior γ grains in HAZ in a steel pipe (high-strength welded steel pipe) to 250 μm or less. Furthermore, the prior γ grains include bainite and intragranular bainite, and the bainite and the intragranular bainite refine the microstructure in the prior γ grains. Meanwhile, it is desirable to use the maximum grain size having a direct influence on characteristics regarding crack initiation as the sizes of the prior γ grains, but the average grain size is used from the statistical viewpoint.

Furthermore, in order to satisfy a demand for an increase in the thickness of the steel pipe, the thickness of the steel pipe (the plate thickness of the steel plate) may be 20 mm to 40 mm. Additionally, in order to satisfy a demand for an increase in the strength of the steel pipe, the tensile strength of the steel plate (base metal) in a direction that corresponds to the circumferential direction of the steel pipe may be 500 MPa to 800 MPa. Meanwhile, portions in the steel plate which are not affected by welding heat are defined as base metals, and portions in the steel plate which are affected by welding heat are defined as HAZ.

Next, a method of manufacturing a high-strength welded steel pipe according to an embodiment of the present invention will be described.

Firstly, a method of manufacturing a steel plate that is used to manufacture a steel pipe will be described. In a steelmaking process, Si and Mn are added to molten steel so as to slightly deoxidize it, then Ti is added, furthermore, the chemical components are adjusted so as to obtain a predetermined composition range (the above chemical composition), and the molten steel is cast, thereby producing slabs. The casting may be carried out by an ordinary method, but continuous casting is preferred from the viewpoint of productivity. Then the slabs are reheated in order to produce steel plates through hot rolling.

The steel plates as described in the embodiment can be obtained under conditions of hot rolling that is ordinarily carried out, and therefore the conditions of the hot rolling are not particularly specified. However, the conditions of the hot rolling are preferably the following conditions from the viewpoint of refining the effective grain sizes of the microstructures of the steel plates.

That is, the reheating temperature is preferably 950° C. or higher. This is for the grain refinement in the steel plates by carrying out the hot rolling at a temperature at which the microstructure of steel becomes an austenite single phase, that is, in the austenite region. The upper limit of the reheating temperature is not specified, but the reheating temperature is preferably 1250° C. or lower from the viewpoint of suppressing a coarsening in the effective grain sizes in the steel plates. The hot rolling may be begun immediately after the slabs are conveyed out from a heating furnace, and the starting temperature of the hot rolling is not particularly specified.

As described above, the conditions of the hot rolling are not particularly limited, but the reduction ratio in thickness at a recrystallization region of higher than 900° C. is preferably 2.0 or more from the viewpoint of refining the effective grain sizes of the steel plates. The reduction ratio in thickness in the recrystallization region refers to a ratio of the plate thickness of the slab to the plate thickness at 900° C. (a value obtained by dividing the slab thickness by the plate thickness at 900° C.). In addition, for the hot rolling in a non-recrystallization region of 900° C. or lower, the reduction ratio in thickness is preferably 2.5 or more from the viewpoint of refining the effective grain sizes of the steel plates, and the reduction ratio in thickness is preferably 3.0 or more in a case in which the effective grain size is further refined. Meanwhile, the reduction ratio in thickness in a non-recrystallization region refers to a ratio obtained by dividing the plate thickness at 900° C. by the plate thickness after the completion of the hot rolling.

In addition, the upper limits of the reduction ratios in thickness in a non-recrystallization region and a recrystallization region are not particularly specified. Meanwhile, when the slab thickness before the hot rolling and the plate thickness after the hot rolling are taken into account, the reduction ratio in thickness in a non-recrystallization region and a recrystallization region may be 12.0 or less.

The finishing temperature of the hot rolling is also not particularly specified, accelerated cooling through water cooling is preferred from the viewpoint of refining the effective grain sizes and improving the strength of the steel plates. The lower limit of the water cooling stop temperature is also not particularly specified. For example, the steel plates may also be cooled to room temperature using water after the hot rolling. However, when improvement in the productivity and suppression of the defects which are caused by hydrogen are taken into account, the water cooling stop temperature is preferably 150° C. or higher.

Next, in manufacturing of the steel pipe, the steel plate obtained by the above method is formed into a pipe shape, and then seam weld portions (both facing edge portions of the steel plate) are seam-welded through arc welding, thereby manufacturing a welded steel pipe. In this case, in order to form the steel plate into a pipe shape, a UOE process in which a C press, a U press, and an O press are carried out is preferably used.

For the arc welding, submerged arc welding is preferably employed from the viewpoint of the toughness of weld metal and the productivity. Particularly, when a 20 mm to 40 mm-thick welded steel pipe is manufactured, the heat input from the inside surface and outside surface of a steel pipe (steel plate) during submerged arc welding is preferably 3.5 kJ/mm to 10.0 kJ/mm. When the heat input is within the above range, using a steel plate having the chemical composition as described above, the prior γ grain size in HAZ can be controlled to 250 μm or less, it is possible to form intragranular bainite in HAZ, and to produce a welded steel pipe having excellent low-temperature toughness. In a case in which submerged arc welding is carried out pass by pass from the inside surface and the outside surface, the heat input during welding from the inside surface and the heat input during welding from the outside surface do not need to be the same, and the heat inputs may be somewhat different.

In order to improve the roundness of the steel pipe after the seam welding, pipe expansion may be carried out. In a case in which the roundness of the steel pipe is improved by pipe expansion, it is necessary to deform the steel pipe to the plastic region, and the pipe expansion ratio is preferably 0.7% or more. The pipe expansion ratio is the percentage of the value obtained by dividing the difference between the outer circumferential length of the steel pipe after pipe expansion and the outer circumferential length of the steel pipe before pipe expansion by the outer circumferential length of the steel pipe before pipe expansion. When the pipe expansion ratio exceeds 2.0%, there are cases in which the toughness of the base metal (base metal portion) or weld is degraded due to plastic deformation. Therefore, the pipe expansion ratio is preferably 0.7% to 2.0%.

In addition, in a case in which coarse MAs are formed due to the arc welding, it is preferable to carry out a heat treatment on the seam-welded portion (the weld and HAZ in the steel pipe). Particularly, when the seam-welded portion is heated to a temperature of 300° C. to 600° C., the coarse MAs formed along the prior austenite grain boundaries are decomposed into bainite and fine cementite, and the toughness improves. When the heating temperature is lower than 300° C., the coarse MAs are not sufficiently decomposed, and there are cases in which the toughness does not sufficiently improve. Therefore, the heating temperature in the heat treatment on the seam-welded portion is preferably 300° C. or higher. On the other hand, when the seam-welded portion is heated to higher than 600° C., there are cases in which precipitates are formed so as to deteriorate the toughness of the weld metal. Therefore, the heating temperature in the heat treatment of the seam-welded portion is preferably 600° C. or lower. In addition, the heating temperature is more preferably 500° C. or lower from the viewpoint of productivity improvement. When the MAs are decomposed into bainite and cementite, microstructures having the same shape as those of MAs having fine white precipitates therein can be observed using a SEM, and therefore it is possible to differentiate MAs (bainite and cementite) after the decomposition and MAs before the decomposition.

In the heat treatment of the seam-welded portion, at least the outside surfaces of the seam-welded portion may be heated using a burner, or high-frequency heating may be carried out on the outside surfaces. In addition, after the outside surface reaches a heat treatment temperature, the seam portion may be immediately cooled. However, in order to accelerate the decomposition of MAs, it is preferable to hold the seam-welded portion in a predetermined temperature range (for example, 300° C. to 600° C.) for 1 second to 600 seconds. When facility costs and productivity are taken into account, the holding time is more preferably 300 seconds or less.

EXAMPLE

The oxygen concentration was adjusted to a range of 0.001% to 0.003% through slight deoxidization when Ti was added, steels having the chemical compositions as shown in Table 1 were prepared as molten steels in a steelmaking process, and then continuously cast, thereby manufacturing 240 mm-thick slabs. The slabs were reheated to 950° C. or higher, rolled to the thicknesses as shown in Table 2, then water cooling was begun and stopped at a variety of temperatures, thereby manufacturing steel plates.

Next, after each of the steel plates was formed into a pipe shape in a UO process, the steel plates were seam-welded through submerged arc welding pass by pass from the front surfaces and the rear surfaces of the steel plates with a welding heat input of 3.5 kJ/mm to 10.0 kJ/mm so as to manufacture steel pipes.

Meanwhile, as the wire that was used for the welding, a wire having the following chemical components was used when dilution of the components due to the steel plates was taken into account. That is, the wire contains, by mass %, 0.010% to 0.120% of C, 0.05% to 0.50% of Si, 1.0% to 2.5% of Mn, 2.0% to 8.5% of Ni, 0.100% or less of Al, and more than 0% to 0.10% or less of Ti as the basic chemical components. In addition, according to the chemical composition and strength of the steel plates, the wire contains one or more of Cr, Mo, and V so that the total amount of Cr, Mo, and V (Cr+Mo+V) is in a range of 1.0% to 5.0%. As such, the wire has a chemical composition in which the balance of the basic chemical components and optional elements is composed of Fe and inevitable impurities.

In addition, heat treatments were carried out on part of the steel pipes at temperatures as shown in Table 2 (the steel pipes were heated to a predetermined temperature at 0.5° C./sec, and then cooled).

Small specimens were taken from welds of the steel pipes, polished, etched, the presence of intergranular ferrite and the presence of intragranular transformed microstructures in HAZ were determined using an optical microscope (measured at three areas of each of the steel types at magnifications of 100 times, 200 times, and 500 times), and the average prior γ grain sizes (the prior γ grain sizes) were measured. Here, for the determination of the presence of intragranular transformed microstructures, the presence of intragranular bainite was used and determined. Meanwhile, bainite formed from inclusions as nuclei in a petal shape is defined as the intragranular bainite. In addition, bainite other than the intragranular bainite is defined as bainite. Furthermore, Charpy absorbed energy in HAZ was measured at −60° C. using V-notched test specimens according to JIS Z 2242. The V-notched test specimen was provided with a V notch at a location of 1 mm from a fusion line on the base metal side. In addition, the tensile test was carried out using API standard test specimens. Furthermore, the Vickers' hardness at the surfaces of the steel pipes was measured. The results are shown in Table 2.

TABLE 1

| Steel No. | C | Si | Mn | P | S | Al | Ti | Mo | B | O | N | Cu | Ni |
|---|---|---|---|---|---|---|---|---|---|---|---|---|---|
| A | 0.029 | 0.10 | 1.94 | 0.007 | 0.0007 | <0.002 | 0.012 | 0.1 | 0.0011 | 0.0017 | 0.0062 | | |
| B | 0.038 | 0.24 | 1.88 | 0.007 | 0.0007 | <0.002 | 0.012 | 0.1 | 0.0011 | 0.0017 | 0.006 | | |
| C | 0.029 | 0.24 | 1.90 | 0.007 | 0.0021 | <0.002 | 0.015 | 0.05 | 0.0022 | 0.0018 | 0.0060 | | |
| D | 0.030 | 0.26 | 1.92 | 0.007 | 0.0021 | 0.004 | 0.013 | 0.05 | 0.0009 | 0.002 | 0.006 | 0.06 | 0.06 |
| E | 0.020 | 0.20 | 1.90 | 0.008 | 0.0004 | 0.004 | 0.013 | 0.05 | 0.001 | 0.0021 | 0.0066 | | |
| F | 0.040 | 0.25 | 1.88 | 0.002 | 0.0023 | 0.005 | 0.012 | 0.1 | 0.001 | 0.0016 | 0.0062 | | |
| G | 0.050 | 0.24 | 1.87 | 0.01 | 0.0004 | <0.002 | 0.02 | 0.1 | 0.0011 | 0.0015 | 0.006 | | |
| H | 0.020 | 0.11 | 2.00 | 0.003 | 0.0005 | 0.004 | 0.012 | 0.05 | 0.0025 | 0.0014 | 0.0062 | | |
| I | 0.030 | 0.24 | 1.87 | 0.002 | 0.0009 | 0.004 | 0.02 | 0.08 | 0.0006 | 0.0023 | 0.0064 | | 0.1 |
| J | 0.020 | 0.15 | 1.92 | 0.007 | 0.0022 | <0.002 | 0.020 | 0.10 | 0.0023 | 0.0021 | 0.0075 | | 0.1 |
| K | 0.030 | 0.06 | 1.88 | 0.002 | 0.001 | 0.05 | 0.012 | 0.1 | 0.001 | 0.0015 | 0.006 | | |
| L | 0.075 | 0.45 | 1.84 | 0.005 | 0.0023 | <0.002 | 0.015 | 0.2 | 0.002 | 0.0015 | 0.006 | | 0.15 |
| M | 0.030 | 0.25 | 1.90 | 0.008 | 0.0023 | 0.007 | 0.012 | 0.1 | 0.001 | 0.0024 | 0.0028 | | |
| N | 0.029 | 0.25 | 1.50 | 0.007 | 0.002 | 0.002 | 0.009 | 0.08 | 0.0006 | 0.0017 | 0.0066 | | |
| O | 0.015 | 0.10 | 1.20 | 0.008 | 0.0020 | 0.002 | 0.015 | 0.08 | 0.0005 | 0.0025 | 0.0060 | | |

| Steel No. | Cr | V | Nb | Zr, Ta | Mg, Ca, REM, Y, Hf, Re, W | Ceq*1 (mass %) | Pcm*2 (mass %) | [N] − [Ti]/3.4 (ppm) | Note |
|---|---|---|---|---|---|---|---|---|---|
| A | | | | | | 0.37 | 0.14 | 27 | Example |
| B | | | 0.012 | | | 0.37 | 0.15 | 25 | |

TABLE 1-continued

| | | | | | | | | | |
|---|---|---|---|---|---|---|---|---|---|
| C | 0.60 | | 0.011 | | Mg: 0.002 | 0.48 | 0.18 | 16 | |
| D | | | | | Hf: 0.0010 Re: 0.0010 | 0.37 | 0.15 | 22 | |
| E | | | 0.01 | | W: 0.16 | 0.35 | 0.13 | 28 | |
| F | | 0.04 | 0.015 | | Y: 0.001 | 0.38 | 0.16 | 27 | |
| G | | | | Ta: 0.0003 | Ca: 0.0006 REM: 0.0006 | 0.38 | 0.16 | 1 | |
| H | 0.06 | | 0.012 | | Ca: 0.0017 REM: 0.001 | 0.38 | 0.14 | 27 | |
| I | 0.03 | 0.01 | 0.01 | Zr: 0.04 | | 0.37 | 0.14 | 5 | |
| J | 0.03 | | 0.010 | | | 0.37 | 0.14 | 16 | |
| K | | | 0.012 | | | 0.36 | 0.14 | 25 | Comparative Example |
| L | 0.4 | 0.046 | 0.04 | Zr: 0.001 | | 0.52 | <u>0.23</u> | 16 | |
| M | | 0.04 | 0.12 | | | 0.37 | 0.15 | −7 | |
| N | | | 0.014 | | Mg: 0.002 | 0.30 | 0.12 | <u>40</u> | |
| O | | | 0.015 | | Mg: 0.0026 | <u>0.23</u> | <u>0.09</u> | 16 | |

*[1] Ceq = [C] + [Mn]/6 + ([Ni] + [Cu])/15 + ([Cr] + [Mo] + [V])/5
*[2] Pcm = [C] + [Si]/30 + ([Mn] + [Cu] + [Cr])/20 + [Ni]/60 + [Mo]/15 + [V]/10 + 5 [B]
* Blank cells mean that the corresponding chemical components are not added.
"<0.002" means that the amount of the corresponding chemical component is less than 0.002 mass %.
* Cells having an underline mean the conditions of the present invention are not satisfied.

TABLE 2

| | | | Tensile strength of steel plate (base metal) (MPa) | Heat input (kJ/mm) | Heat treatment temperature (° C.) | Hardness*[1] (Hv) | Microstructure of HAZ | | | HAZ toughness*[2] vE-60 (J) | Note |
|---|---|---|---|---|---|---|---|---|---|---|---|
| Production No. | Steel No. | Plate thickness (mm) | | | | | Presence of intergranular ferrite | Prior austenite grain size (μm) | Presence of intragranular transformed microstructure | | |
| 1 | A | 20 | 588 | 4.3 | | 200 | No | 230 | Yes | 98 | Example |
| 2 | A | 25 | 575 | 5.1 | | 204 | No | 230 | Yes | 194 | |
| 3 | A | 30 | 565 | 6.0 | | 202 | No | 240 | Yes | 104 | |
| 4 | A | 30 | 565 | 6.0 | 350 | 206 | No | 240 | Yes | 124 | |
| 5 | A | 30 | 565 | 6.0 | 400 | 201 | No | 240 | Yes | 196 | |
| 6 | A | 30 | 565 | 6.0 | 500 | 197 | No | 240 | Yes | 112 | |
| 7 | B | 25 | 590 | 5.1 | | 206 | No | 230 | Yes | 328 | |
| 8 | B | 30 | 583 | 6.0 | | 204 | No | 245 | Yes | 272 | |
| 9 | B | 30 | 583 | 6.0 | 350 | 206 | No | 245 | Yes | 284 | |
| 10 | C | 30 | 725 | 6.0 | | 210 | No | 226 | Yes | 242 | |
| 11 | D | 25 | 580 | 5.1 | | 208 | No | 230 | Yes | 349 | |
| 12 | D | 25 | 580 | 5.1 | 400 | 208 | No | 230 | Yes | 352 | |
| 13 | E | 30 | 548 | 6.0 | | 200 | No | 225 | Yes | 379 | |
| 14 | E | 35 | 530 | 6.5 | | 204 | No | 235 | Yes | 365 | |
| 15 | F | 25 | 600 | 5.1 | | 204 | No | 230 | Yes | 272 | |
| 16 | G | 25 | 630 | 5.1 | | 212 | No | 240 | Yes | 186 | |
| 17 | H | 25 | 565 | 5.1 | | 205 | No | 220 | Yes | 385 | |
| 18 | H | 30 | 565 | 6.0 | | 202 | No | 235 | Yes | 365 | |
| 19 | I | 30 | 576 | 6.0 | | 205 | No | 230 | Yes | 384 | |
| 20 | J | 25 | 562 | 5.1 | | 202 | No | 225 | Yes | 106 | |
| 21 | <u>K</u> | 30 | 580 | 6.0 | | 205 | No | 245 | <u>No</u> | 10 | Comparative Example |
| 22 | <u>L</u> | 30 | 665 | 6.0 | | 234 | No | 240 | Yes | 15 | |
| 23 | <u>M</u> | 30 | 625 | 6.0 | | 206 | No | <u>405</u> | Yes | 32 | |
| 24 | <u>N</u> | 30 | 572 | 6.0 | | 200 | <u>Yes</u> | 220 | <u>No</u> | 12 | |
| 25 | <u>O</u> | 34 | 498 | 6.6 | | 191 | <u>Yes</u> | 232 | Yes | 12 | |

*[1] Hardness is Vickers hardness in HAZ.
*[2] HAZ toughness is evaluated by Charpy absorbed energy at −60° C.
* Cells having an underline mean the conditions of the present invention are not satisfied.

In examples of Production Nos. 1 to 20, coarse intergranular ferrite was suppressed in the microstructures in HAZ, the prior γ grain sizes were 250 μm or less, intragranular transformed microstructures were observed, and therefore the steel pipes had fine structures including bainite and intragranular bainite. Charpy absorbed energies thereof were all 50 J or more at an extremely low temperature of −60° C.

Meanwhile, in Production No. 21, since an excessive amount of Al was added, coarse microstructures having no intragranular transformation observed were included in HAZ, and the absorbed energy in HAZ was decreased. In Production No. 22, since the carbon equivalent Ceq and the parameter crack measurement Pcm were high, the strength was increased, and, consequently, the absorbed energy in HAZ was decreased. In Production No. 23, since the amount of N added was small, the prior γ grain sizes were increased, and the absorbed energy in HAZ was decreased. In Production No. 24, since the value of [N]−[Ti]/3.4 was 30 ppm (0.003%) or more, the hardenability by B was degraded, and coarse intergranular ferrite was formed. As a result, in Production No. 24, the absorbed energy in HAZ was decreased. In Production No. 25, since the carbon equivalent Ceq and the parameter crack measurement Pcm were low, coarse intergranular ferrite was formed so that the absorbed energy in HAZ was decreased, and the strength of the base metal was low.

INDUSTRIAL APPLICABILITY

It is possible to provide a high-strength welded steel pipe having improved low-temperature toughness in HAZ even when the thickness is 20 mm or more, and a method of manufacturing the same.

What is claimed is:

1. A high-strength welded steel pipe obtained by welding a seam weld portion of a steel plate into forming a pipe shape,
wherein a base metal of the steel plate includes, by mass %,
C: 0.010% to 0.080%,
Si: 0.01% to 0.50%,
Mn: 0.50% to 2.00%,
S: 0.0001% to 0.0050%,
Ti: 0.003% to 0.030%,
Mo: 0.05% to 1.00%,
B: 0.0003% to 0.0100%,
O: 0.0001% to 0.0080%,
N: 0.006% to 0.0118%,
P: limited to 0.050% or less,
Al: limited to 0.008% or less, and
a balance of iron and inevitable impurities,
wherein a Ceq that is obtained from a following equation <7> is 0.30 to 0.53, a Pcm that is obtained from a following equation <8> is 0.10 to 0.20, the [N] and the [Ti] satisfy a following equation <9>, wherein an average grain size of prior γ grains in a heat affected zone in the steel plate is 250 μm or less, and the prior γ grains include bainite and intragranular bainite, $$Ceq=[C]+[Mn]/6+([Ni]+[Cu])/15+([Cr]+[Mo]+[V])/5 \quad <7>$$

$$Pcm=[C]+[Si]/30+([Mn]+[Cu]+[Cr])/20+[Ni]/60+[Mo]/15+[V]/10+5[B] \quad <8>$$

$$[N]-[Ti]/3.4<0.003\% \quad <9>$$

wherein [C], [Si], [Mn], [Ni], [Cu], [Cr], [Mo], [V], [B], [N], and [Ti] are defined as the amounts of C, Si, Mn, Ni, Cu, Cr, Mo, V, B, N, and Ti in mass %, respectively.

2. The high-strength welded steel pipe according to claim 1,
wherein the base metal further includes, by mass %, one or more selected from
Cu: 0.05% to 1.5%,
Ni: 0.05% to 5.00%,
Cr: 0.02% to 1.50%,
W: 0.01% to 0.50%,
V: 0.010% to 0.100%,
Nb: 0.001% to 0.200%,
Zr: 0.0001% to 0.0500%,
Ta: 0.0001% to 0.0500%,
Mg: 0.0001% to 0.0100%,
Ca: 0.0001% to 0.0050%,
REM: 0.0001% to 0.0050%,
Y: 0.0001% to 0.0050%,
Hf: 0.0001% to 0.0050%, and
Re: 0.0001% to 0.0050%.

3. The high-strength welded steel pipe according to claim 1,
wherein a plate thickness of the base metal is 20 mm to 40 mm.

4. The high-strength welded steel pipe according to claim 1,
wherein, in a case in which a circumferential direction is a tensile direction, a tensile strength of the base metal is 500 MPa to 800 MPa.

5. A method of manufacturing a high-strength welded steel pipe, the method comprising:
forming a steel plate having the chemical composition according to claim 1 into a pipe shape; and
seam-welding a seam weld portion through an arc welding so as to form a seam-welded portion.

6. The method of manufacturing the high-strength welded steel pipe according to claim 5,
wherein the arc welding is a submerged arc welding.

7. The method of manufacturing the high-strength welded steel pipe according to claim 6,
wherein a heat input of the submerged arc welding is 3.5 kJ/mm to 10.0 kJ/mm.

8. The method of manufacturing the high-strength welded steel pipe according to claim 5, the method further comprising,
performing a heat treatment of the seam-welded portion.

9. The method of manufacturing the high-strength welded steel pipe according to claim 8,
wherein a heating temperature is 300° C. to 600° C. during the heat treatment.

* * * * *